United States Patent [19]

Iijima et al.

[11] Patent Number: 5,967,545
[45] Date of Patent: Oct. 19, 1999

[54] DEVICE FOR REGULATING THE PRESSURE OF AN AIR BAG FOR A TWO-WHEELED MOTOR VEHICLE

[75] Inventors: Satoshi Iijima; Soichiro Hosono, both of Saitama, Japan

[73] Assignee: Honda Giken Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/873,031

[22] Filed: Jun. 11, 1997

[30] Foreign Application Priority Data

Jun. 11, 1996 [JP] Japan ................................. 8-148832

[51] Int. Cl.⁶ ............................ B60R 21/22; B60R 21/28
[52] U.S. Cl. ..................... 280/730.1; 280/739; 280/748
[58] Field of Search .................................. 280/739, 731, 280/730.1, 751, 753, 728.1, 748; 137/223, 224, 537, 541

[56] References Cited

U.S. PATENT DOCUMENTS

| | | |
|---|---|---|
| 3,336,942 | 8/1967 | Keith et al. .............................. 137/537 |
| 3,788,666 | 1/1974 | Kramer et al. .......................... 280/739 |
| 3,930,667 | 1/1976 | Osuchowski et al. ............... 280/730.1 |
| 4,227,717 | 10/1980 | Bouvier .................................. 280/753 |
| 4,299,406 | 11/1981 | Thomas .................................. 280/733 |
| 4,681,139 | 7/1987 | Falconer ................................. 137/537 |
| 4,827,975 | 5/1989 | Steiger .................................... 137/537 |
| 5,044,663 | 9/1991 | Seizert .................................... 280/731 |
| 5,368,327 | 11/1994 | Shiraki et al. .......................... 280/731 |

FOREIGN PATENT DOCUMENTS

| | | |
|---|---|---|
| 6-44759Y2 | 11/1994 | Japan . |
| 90/09908 | 9/1990 | WIPO .................................. 280/739 |

*Primary Examiner*—Paul N. Dickson
*Attorney, Agent, or Firm*—Birch, Stewart, Kolasch & Birch, LLP

[57] ABSTRACT

A valve for regulating the pressure of an air bag for a two-wheeled motor vehicle is provided. The valve regulates the internal pressure of the air bag to restrain a rider effectively. The pressure-regulating valve is disposed in a vent hole formed in the air bag. When the internal pressure of the air bag exceeds a predetermined value, the vent hole is opened. When the internal pressure drops to the predetermined value, the vent hole is closed to maintain the air bag in a half-expanded state so that the rider continues to be cushioned against shocks of a crash.

17 Claims, 6 Drawing Sheets

DEVICE FOR REGULATING THE PRESSURE OF AN AIR BAG FOR A TWO-WHEELED MOTOR VEHICLE

BACKGROUND OF THE INVENTION

1. Field of the Invention

The present invention relates to a device for regulating the pressure of an air bag for a two-wheeled motor vehicle.

2. Description of Related Art

Recently, an air bag device has become well known for cushioning an occupant of a vehicle, such as a passenger in an automobile vehicle, against a shock of a crash. Also well known is a device in which a sectional area of a vent hole formed in an air bag is varied to make constant the internal pressure of the air bag when expanded, thereby enhancing its occupant-restraining performance. In particular, see Japanese Utility Model Publication No. 44759/94.

For a two-wheeled motor vehicle, there has been a desire to develop an air bag device capable of attaining a cushioning effect. In the case of a two-wheeled motor vehicle, however, a problem is encountered such that, if all the gas contained in an air bag is exhausted even slowly after a primary crash, it is impossible to restrain the rider of the vehicle to a satisfactory extent.

SUMMARY OF THE INVENTION

Thus, it is an object of the present invention to provide a novel device for regulating the pressure of an air bag for a two-wheeled motor vehicle, thus maintaining the air bag in a half-expanded state even after a primary crash, thereby enhancing its rider-restraining performance.

According to the invention, in order to achieve the above-mentioned object, there is provided a device for regulating the pressure of the air bag disposed on a body frame of a two-wheeled motor vehicle, characterized in that a pressure-regulating valve is disposed in a vent hole formed in the air bag, said pressure-regulating valve having a valve capable of opening and closing the vent hole and a member for urging the valve in a closing direction. When the internal gas pressure of the air bag exceeds a predetermined value, the vent hole is opened. When the internal gas pressure drops to the predetermined value, the vent hole is closed to maintain the air bag in a half-expanded state.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are not limitations on the present invention.

DETAILED DESCRIPTION OF THE PREFERRED EMBODIMENT

Figure 1:
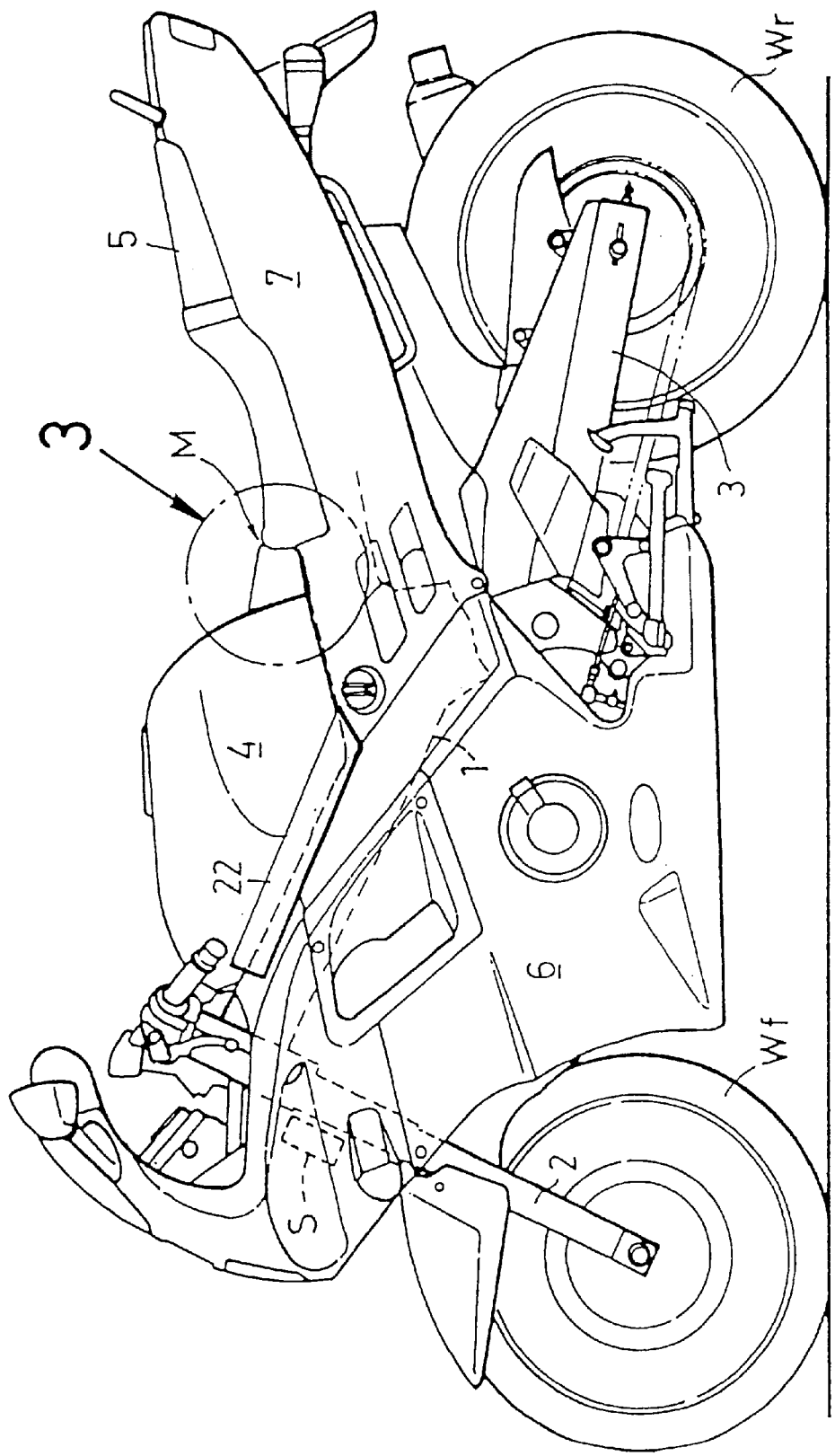
FIG. 1 is a side view of a two-wheeled motor vehicle equipped with the device of the present invention.

In FIG. 1, front forks 2 are supported steerably at a front portion of a body frame 1 of a two-wheeled motor vehicle. A front wheel Wf is supported rotatably by the front forks 2. Swing arms 3 are suspended vertically and swingably by a rear portion of the body frame 1. A rear wheel Wr is supported by the swing arms 3. Further, a fuel tank 4 is mounted on an upper front half portion of the body frame 1. A seat 5 is mounted on seat rails at a rear portion of the body frame 1 so that it can rise and fall. A greater part of the body frame 1 is covered with a front cowl 6 and a rear cowl 7.

Figure 2:
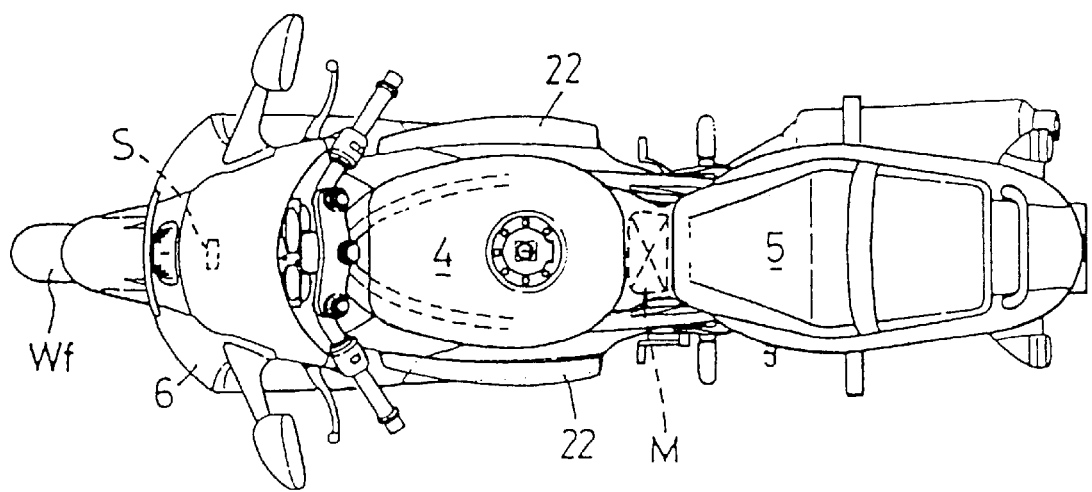
FIG. 2 is a top plan view thereof.

As shown in both FIGS. 1 and 2, a space is formed between the rear portion of the fuel tank 4 and the front portion of the seat 5, and an air bag module M of the air bag device is disposed in the space.

The structure of the air bag module M and a structure for mounting the same module will now be described mainly with reference to FIG. 3. A mounting stay 10 is fixed to the upper surface of the body frame 1 in the space formed between the fuel tank 4 and the seat 5. A lower opening portion of an air bag housing 12 is attached onto the mounting stay 10 through a first mounting piece 11. The air bag housing 12 is formed in the shape of a cap using a lightweight material, such as a synthetic resin. The air bag housing 12 has a receptacle portion $12_1$ capable of receiving therein an air bag 14 in a folded state and a cover portion $12_2$ for closing an upper opening of the receptacle portion $12_1$. Around the cover portion $12_2$, except for a hinge portion $12_3$ formed on one side, there is formed a frangible portion $12_4$ which can be ruptured easily. When an impact force larger than a predetermined value acts on the two-wheeled motor vehicle and the air bag 14 begins to expand, the frangible portion $12_4$ is ruptured by the expansion force, so that the cover portion $12_2$ is opened upwardly with the hinge portion $12_3$ acting as a fulcrum, thus permitting upward expansion of the air bag 14, as best shown in FIG. 7.

Figure 7:
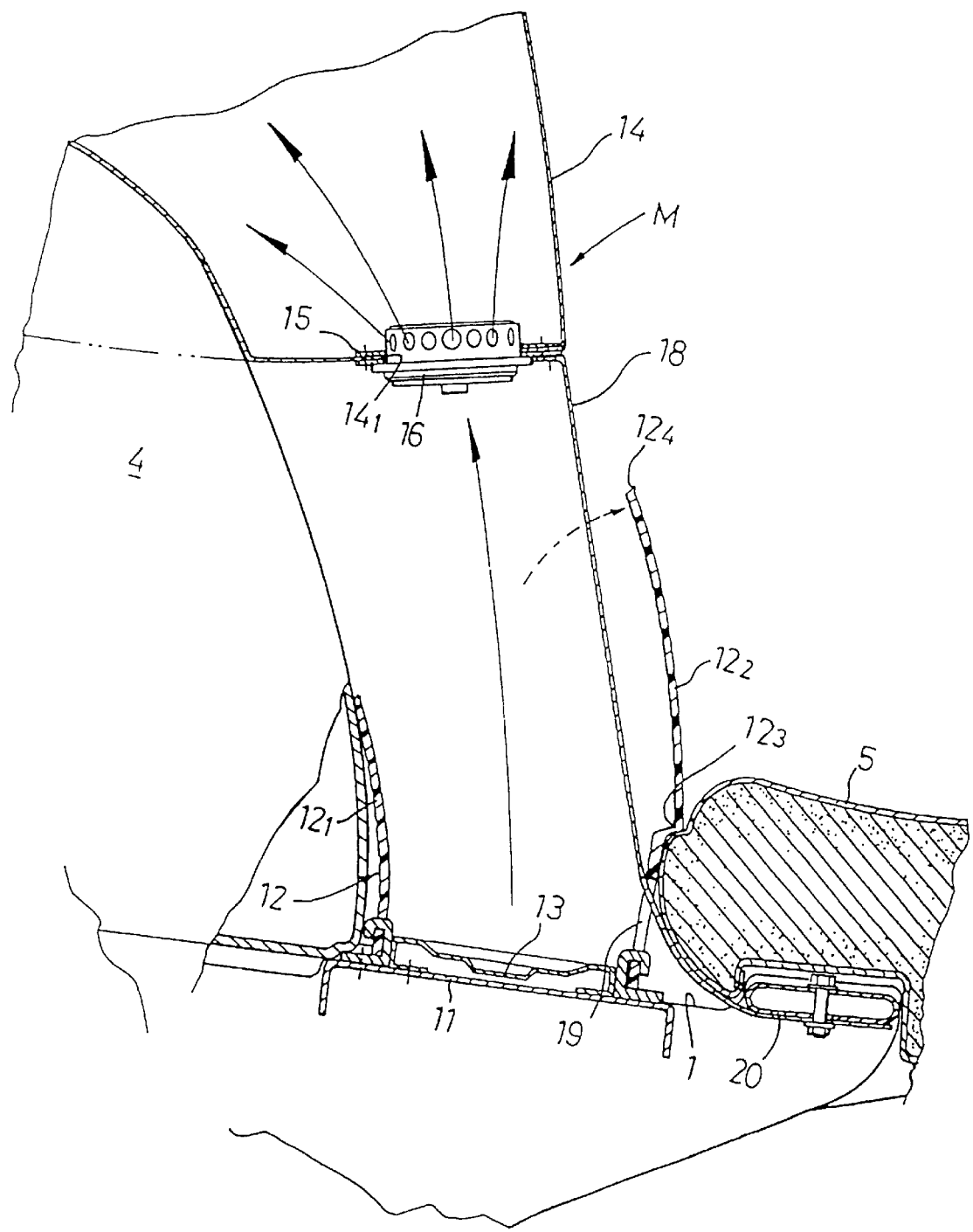
FIG. 7 is an enlarged, longitudinal sectional view of the portion indicated by arrow 7 in FIG. 6.

In the air bag housing 12 of FIG. 7, a base plate 13 is fixed to the mounting piece 11, and the air bag module M is separated from the base plate 13.

Figure 3:
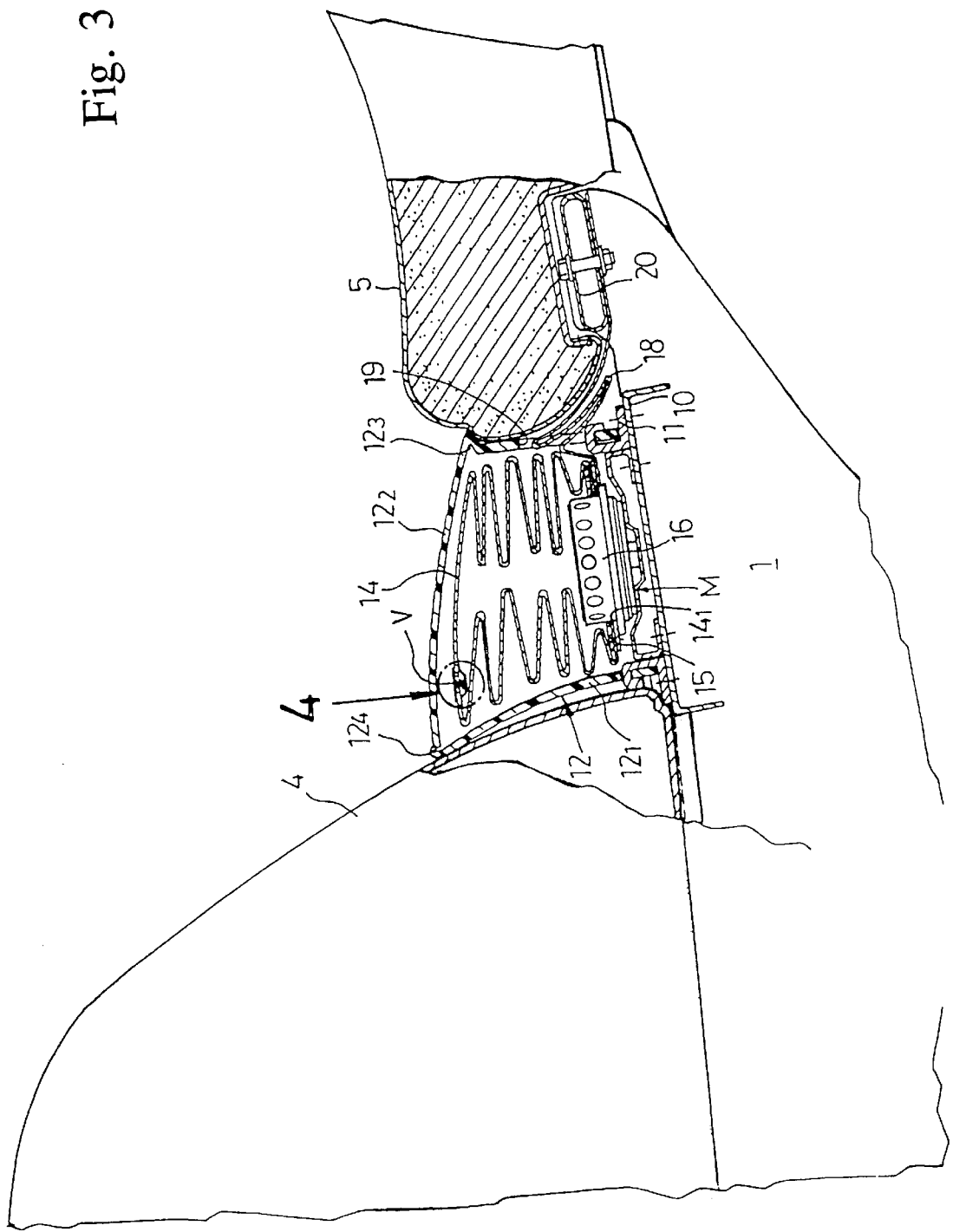
FIG. 3 is an enlarged, longitudinal sectional view of the portion indicated by arrow 3 in FIG. 1.

The air bag module M includes an inflator 16 for producing a gas to expand the air bag 14 which is formed in the shape of a bag having a bottom opening $14_1$ and is accommodated in a folded state within the air bag housing 12, as best seen in FIG. 3. A mouthpiece 15 is fixed to the bottom opening $14_1$, and the inflator 16 is fixed to the mouthpiece 15 in a hermetically sealed state. In this state, the inflator 16 is placed and supported directly on the base plate 13 before being separated therefrom, as seen in FIG. 7.

Figure 4:
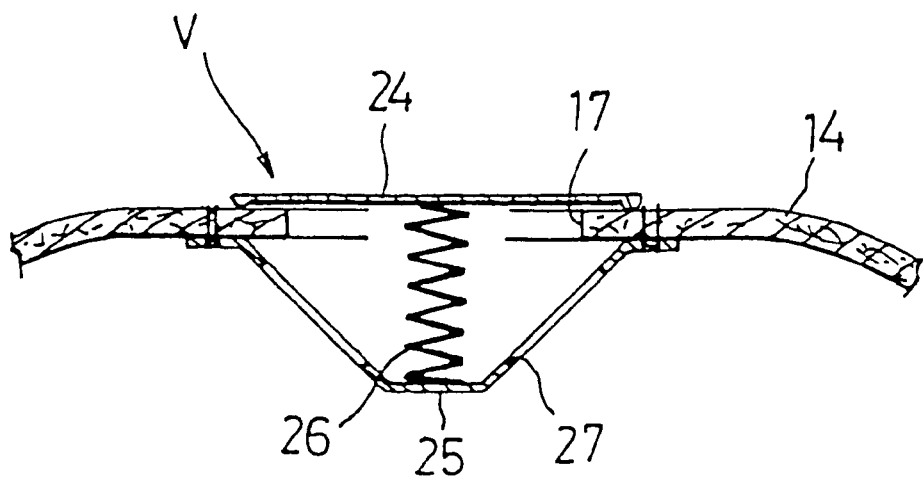
FIG. 4 is an enlarged, longitudinal sectional view of a pressure-regulating valve indicated by arrow 4 in FIG. 3.

As shown in FIG. 4, the air bag 14 is formed by coating a polyamide base cloth of a high tensile strength with a coating material for the prevention of gas leakage. A vent hole 17 for the release of inside gas is formed in a suitable position of the air bag 14. The inflator 16 of FIG. 7 is a known type such as, for example, a gas type, fixed-type, mixing gas type, or gas lead-in type.

In the air bag 14 of FIG. 4, there is disposed a pressure-regulating valve V and a vent hole 17 for regulating the escape of the internal gas pressure from the air bag 14.

Figure 5:
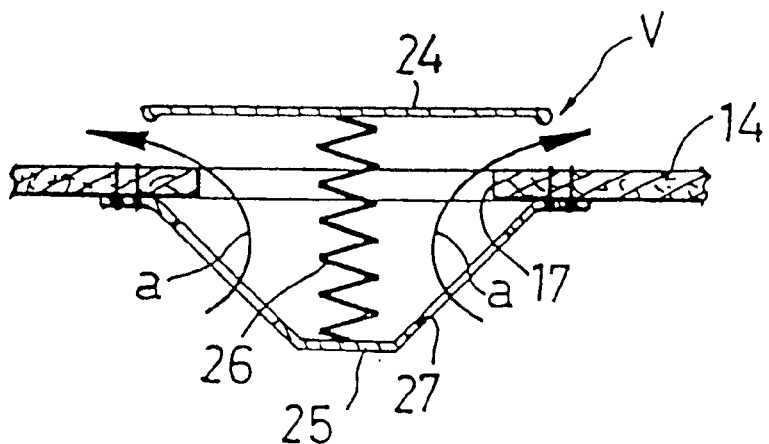
FIG. 5 is a longitudinal sectional view of the pressure-regulating valve which is in an opened state.

The structure of the pressure-regulating valve V will now be described with reference to FIGS. 4 and 5. On the outer surface side of the vent hole 17 formed in the air bag 14, there is disposed a top plate-like valve 24 capable of opening and closing the vent hole 17. A stay 25 having a funnel-like section is secured, for example by sewing, to an inner surface of the air bag 14 in a surrounding relationship to the vent hole 17. A valve spring 26, which is a tension-coil spring and which serves as an urging member, is anchored at both ends thereof centrally between the stay 25 and the valve 24. The valve spring 26 pulls the valve 24 in a closing direction. Vent holes 27 are formed in side sections of the stay 25, and the interior of the air bag 14 is in communication with the vent hole 17 through the plurality of vent holes 27. When the internal gas pressure of the air bag 14 becomes larger than the valve-closing force of the valve spring 26, the valve 24 is pushed open and the high-pressure gas present within the air bag 14 is released along exhaust passages indicated by arrows "a" to the exterior through the vent hole 17, as best shown in FIG. 5. With a decrease in the internal gas pressure of the air bag 14, flow through the exhaust passages "a" of the air bag 14 decreases. Further, when the internal gas pressure of the air bag 14 drops to a predetermined value, the pressure-regulating valve V is closed again by being pulled shut by the spring 26, as best shown in FIG. 4.

To the mouthpiece 15 fixed in the bottom opening $14_1$ of the air bag 14 in FIG. 7, there is connected one end of an air bag anchoring member 18 having flexibility and elasticity. The anchoring member 18, seen in a folded state in FIG. 3, is drawn out, as seen in FIG. 7, to the exterior of the air bag housing 12 through an outlet 19 formed in a rear wall of the housing 12. Another end of the anchoring member 18 is extended below the seat 5 in FIG. 3 and is connected to a second mounting piece 20 which is secured with a bolt or the like to the body frame 1 at a position just under the front portion of the seat 5. The anchoring member 18 has, for example, a single or plural strings, belts, or sheets, so as to be easily folded and it has sufficient tensile strength, when fully extended as shown in FIG. 7, to prevent separation of the air bag 14 from the body frame 1.

In front of the air bag module M, as shown in FIGS. 1 and 2, air bag guide frames 22 are fixed to the body frame 1 so as to surround both sides of the fuel tank 4. Upper surfaces of the guide frames 22 are inclined forwardly and upwardly along an upper surface of the fuel tank 4 so that the air bag 14 of FIG. 6 expands while being guided by the upper surfaces of both guide frames 22 and the fuel tank 4.

As shown in FIG. 1, a shock sensor S. e.g. a gravitational or G sensor, is attached to a front portion of the body frame 1. With a detection signal provided from the sensor S, the inflator 16 of FIG. 7 operates to supply the high-pressure gas into the air bag 14.

Figure 6:
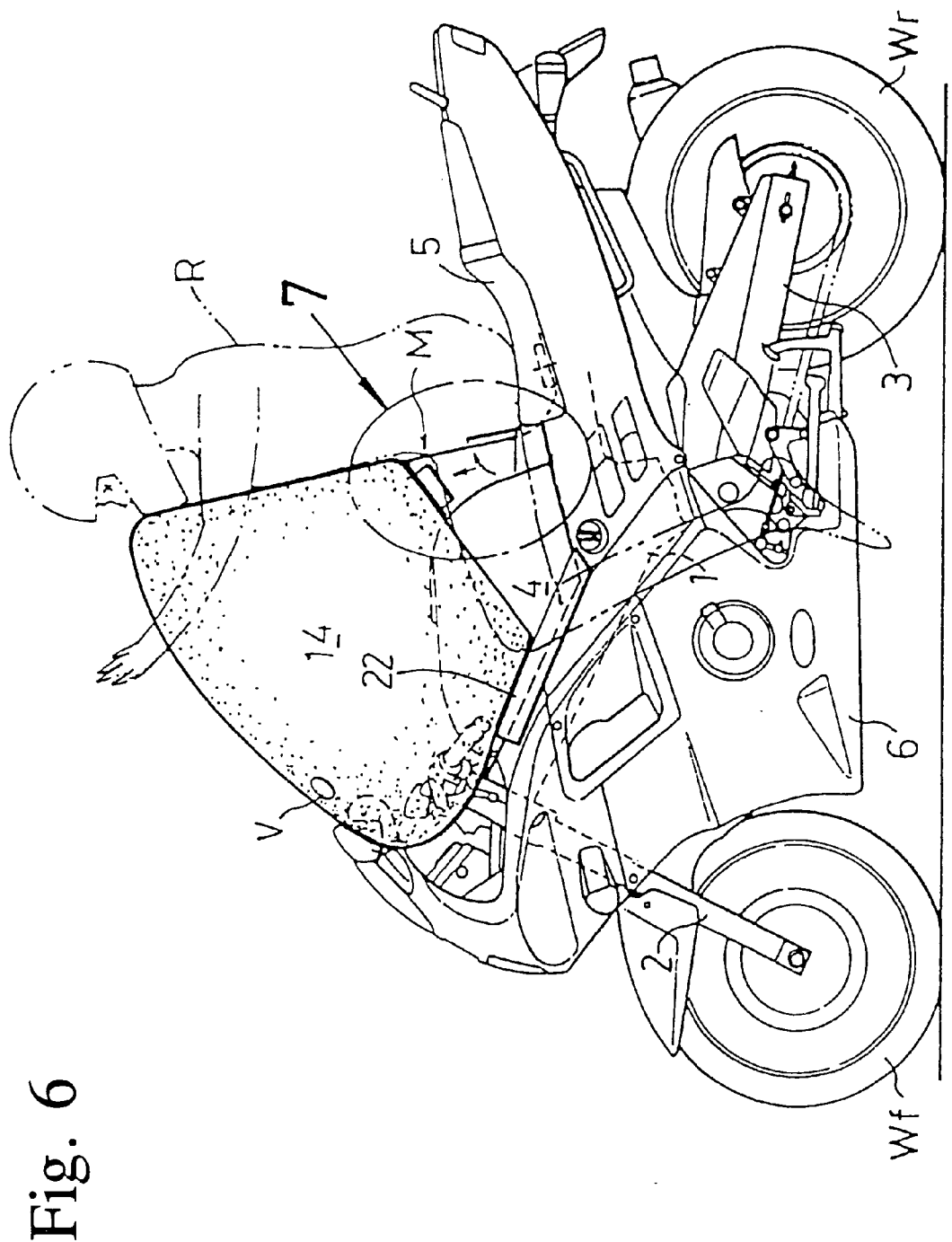
FIG. 6 is a side view of the two-wheeled motor vehicle with the air bag in an expanded state.

The operation of this embodiment will now be described. If the two-wheeled motor vehicle is involved in an accident and crashes against an obstacle, the shock sensor S of FIGS. 1 and 2 detects this situation and sends an electrical signal to the inflator 16 of FIGS. 3 and 7, thus causing the inflator 16 to operate and release the high-pressure gas. The gas is fed into the folded air bag 14 of FIG. 3 through the bottom opening $14_1$, so that the air bag 14 is expanded. At this time, the air bag 14 expands obliquely and upwardly towards the front and along the upper surfaces of both guide frames 22 and the fuel tank 4, as shown in FIG. 6. Since the air bag 14 is anchored to the body frame 1 below the seat 5 by the anchoring member 18 of FIG. 7, the expansion of the air bag 14 results in the anchoring member 18 being pulled and stretched. Consequently, the underside of the air bag 14 floats away from the body frame 1, but the air bag 14 is held at a position opposed to a rider R, as seen only in FIG. 6. Thus, it is possible to restrain and cushion the rider R against shocks of the crash.

After the air bag 14 has thus been expanded by supplying the high-pressure gas, the pressure-regulating valve V is opened, due to an increase in the internal pressure of the air bag 14, as shown in FIG. 5, so that the vent hole 17 is opened and the high-pressure gas present within the air bag 14 is released to the exterior along the exhaust passages "a". Consequently, the air bag 14 of FIGS. 6 and 7 is contracted slowly while still restraining the rider R.

When the internal pressure of the air bag 14 drops to the predetermined value after release of the high-pressure gas from the air bag 14, the valve 24 moves from its opened position, as seen in FIG. 5, towards its closed position, as seen in FIG. 4, by virtue of the valve spring 26 pulling down in the valve-closing direction, thereby reducing the opening area of the vent hole 17 gradually. Eventually, the pressure-regulating valve V is completely closed. As a result, the gas remaining in the air bag 14 is sealed therein and hence the air bag 14 can continue to restrain the rider R in FIG. 6 while maintaining its half-expanded state at the predetermined value of internal pressure.

In other words, after expansion against a primary shock, the air bag 14 does not contract completely, but is maintained in a half-expanded state. Therefore, even if the rider R should get another shock after receiving a primary shock from the crash of the two-wheeled motor vehicle, the air bag 14 can continue restraining the rider R.

Although an embodiment of the present invention has been described above, the invention is not limited thereto, but various modifications may be made within the scope of the invention. For example, although in the above embodiment the pressure-regulating valve V of FIGS. 4 and 5 is composed of a plate-like valve 24, a stay 25, and a valve spring 26, it may be constituted by other equivalents. Moreover, although in the above embodiment the air bag 14 of FIG. 7 is anchored to the vehicle body frame 1 by an anchoring member 18 at the time of its expansion, the air bag 14 may be attached to the vehicle body frame 1 using any other mounting means. Alternatively, the air bag 14 may be rendered separable from the body frame 1. Preferably, the air bag 14 has such shape and size so as to restrain the rider R in FIG. 6 even in the event that the rider R should be thrown from the two-wheeled motor vehicle.

According to the present invention, as shown in FIGS. 4 and 5, the vent hole 17 is formed in the air bag 14, the pressure-regulating valve V disposed therein has a plate-like valve 24 which can open and close the vent hole 17, and the spring 26 urges the valve 24 in a closing direction. When the internal gas pressure of the air bag 14 exceeds a predetermined value, the vent hole 17 is opened. When the internal gas pressure drops to the predetermined value, the vent hole 17 is closed to maintain the air bag 14 in a half-expanded state. Therefore, the rider-cushioning effect can be further enhanced against secondary shocks.

The invention being thus described, it will be clear that the same may be varied in many ways. Such variations are not to be regarded as departures from the spirit and scope of the invention, as all such modifications would be discernible to one skilled in the pertinent art and are intended to be included within the scope of the following claims.

We claim:

1. A device on a two-wheeled motor vehicle, the two-wheeled motor vehicle including a fuel tank and a seat located rearwardly of the fuel tank, said device comprising:

an air bag having a vent hole therein;

a housing located between the seat and the fuel tank for containing the air bag therein; and a pressure-regulating valve disposed in said vent hole formed in the air bag, said pressure-regulating valve having a plate valve capable of opening and closing the vent hole and a tension spring for urging the plate valve in a closing direction;

whereby the vent hole is opened when internal gas pressure of the air bag exceeds a predetermined value, and whereby the vent hole is closed when the internal gas pressure drops to the predetermined value, thereby maintaining the air bag in a half-expanded state, so that a rider on the two-wheeled motor vehicle is cushioned against a shock of a crash, and wherein the pressure-regulating valve and the vent hole are positioned on the air bag so that they do not contact the rider or the two-wheeled motor vehicle in a crash.

2. The device according to claim 1, wherein said pressure-regulating valve includes a bottom stay, and a plurality of vent holes arranged in the bottom stay.

3. The device according to claim 2, wherein said tension spring is fixedly attached to the plate valve and the bottom stay.

4. The device according to claim 3, wherein the stay is funnel shaped.

5. The device according to claim 1, further comprising:

a base plate for securing the air bag inside the housing; and an inflator for expanding the air bag out of the housing.

6. The device according to claim 5, wherein said housing includes a receptacle portion, a cover portion, a hinge portion, a frangible portion, and a rear wall operatively connected together.

7. The device according to claim 6, wherein said air bag has a bottom opening in which the inflator is disposed.

8. The device according to claim 7, and further including a mouthpiece fixed to the bottom opening.

9. The device according to claim 8, and further including means, connected to the mouthpiece, for anchoring one end of the air bag.

10. The device according to claim 5, and further including a guide for guiding the air bag while expanding out of the housing.

11. The device according to claim 5, and further including a sensor for detecting a shock to signal the inflator to supply high-pressure gas into the air bag.

12. A device for a two-wheeled motor vehicle, comprising:

an air bag having a vent hole therein;

a pressure-regulating valve disposed in said vent hole formed in the air bag, said pressure-reculating valve having a plate valve capable of opening and closing the vent hole and a tension spring for urging the plate valve in a closing direction;

a housing for containing the air bag, said housing including a receptacle portion, a cover portion, a hinge portion, a frangible portion, and a rear wall operatively connected together;

a base plate for securing the air bag inside the housing;

an inflator for expanding the air back out of the housing;

said air bag having a bottom opening in which the inflator is disposed;

a mouthpiece fixed to the bottom opening;

anchoring means, connected to the mouthpiece, for anchoring one end of the air bag; and an outlet, formed in the rear wall of the housing, through which the anchoring means is drawn out when the air bag is expanded, whereby the vent hole is opened when internal gas pressure of the air bag exceeds a predetermined value, and whereby the vent hole is closed when the internal gas pressure drops to the predetermined value, thereby maintaining the air bar in a half-expanded state, so that a rider on the two-wheeled vehicle is cushioned against a shock of a crash, and wherein the pressure-regulating valve and the vent hole are positioned on the air bag so that they do not contact the rider or the two-wheeled vehicle in a crash.

13. The device according to claim 13, wherein said pressure-regulating valve includes a bottom stay, and a plurality of vent holes arranged in the bottom stay.

14. The device according to claim 13, wherein said tension spring is fixedly attached to the plate valve and the bottom stay.

15. The device according to claim 14, wherein the stay is funnel shaped.

16. The device according to claim 12, and further including a guide for guiding the air bag while expanding out of the housing.

17. The device according to claim 12, and further including a sensor for detecting a shock to signal the inflator to supply high-pressure gas into the air bag.

* * * * *